United States Patent
Wang et al.

(10) Patent No.: US 7,848,409 B2
(45) Date of Patent: Dec. 7, 2010

(54) MACROBLOCK LEVEL BIT ALLOCATION

(75) Inventors: Haohong Wang, San Diego, CA (US); Narendranath Malayath, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1335 days.

(21) Appl. No.: 11/120,389

(22) Filed: May 2, 2005

(65) Prior Publication Data

US 2006/0245493 A1 Nov. 2, 2006

(51) Int. Cl.
*H04N 7/12* (2006.01)

(52) U.S. Cl. .............................. 375/240.03; 375/240.02

(58) Field of Classification Search .................. 375/240, 375/240.01, 240.02, 240.03, 240.12, 240.14, 375/240.23

See application file for complete search history.

(56) References Cited

U.S. PATENT DOCUMENTS

| | | | |
|---|---|---|---|
| 5,134,476 A | | 7/1992 | Aravind et al. |
| 5,144,424 A | | 9/1992 | Savatier |
| 5,400,075 A | * | 3/1995 | Savatier ................. 375/240.23 |
| 5,638,126 A | | 6/1997 | Lim |
| 6,011,589 A | * | 1/2000 | Matsuura et al. ....... 375/240.14 |

FOREIGN PATENT DOCUMENTS

| | | |
|---|---|---|
| WO | 9904359 A1 | 1/1999 |
| WO | 0045605 A1 | 8/2000 |

OTHER PUBLICATIONS

Zhihai He, et al: "A Linear Source Model and a Unified Rate Control Algorithm for DCT Video Coding". IEEE Transactions on Circuits and Systems for Video Technology, IEEE Service Center, Piscataway, N J, US, vol. 12, No. 11, Nov. 2002, pp. 971-982.*
T. Chiang, et al: "A new rate control scheme using quadratic rate distortion model", IEEE Transactions on Circuits and Systems for Video Technology, vol. 7, No. 1 Feb. 1997.
Y.Shoham, et al: "Efficient bit allocation for an arbitrary set of quantizers", IEEE Transactions on Acoustics, Speech, Signal Processing, vol. 36, No. 9, Sep. 1988.
G.M. Schuster, et al: "Fast and efficient mode an quantizer selection in the rate distortion sense for H.263", in SPIE Proc. Conf. Visual Communications and Image Processing, Mar. 1996.
H. Wang, et al: "Rate-distortion optimal bit allocation scheme for object-based video coding", IEEE Transactions on Circuits and Systems for Video Technology, vol. 15, No. 9, Sep. 2005.

(Continued)

*Primary Examiner*—Allen Wong

(57) ABSTRACT

The disclosure is directed to video processing. The various video processing techniques include generating blocks of information for a frame of video, allocating bits from a bit budget to each of the blocks, the number of bits being allocated to each of the blocks being a function of the information contained therein, and using the bits allocated to each of the blocks to represent the information contained therein.

44 Claims, 4 Drawing Sheets

OTHER PUBLICATIONS

E.Y. Lam, et al: "A mathematical analysis of the DCT coefficient distributions for images", IEEE Transactions on Image Processing, vol. 9, No. 10, Oct. 2000.

J. Tsai, et al: "Modified TMN8 rate control for low-delay video communications", IEEE Trans. Circuits and Systems for Video Technology, vol. 14, No. 6, Jun. 2004.

N. Kamaci, et al: "p-domain rate-distortion optimal rate control for DCT-based video coders", in Proc. IEEE Int. Conf. Acoustics, Speech, and Signal Processing, Montreal, Canada, vol. III, May 2004.

T.M. Cover, et al: "Elements of information theory", Wiley, New York, NY, 1991.

S. Hong, et al: "Rate control of MPEG video for consistent picture quality", IEEE Transactions on Broadcasting, vol. 49, No. 1, Mar. 2003.

International Search Report—PCT/US06/017120, International Search Authority—European Patent Office—Sep. 6, 2006.

Written Opinion—PCT/US06/017120, International Search Authority—European Patent Office—Sep. 6, 2006.

International Preliminary Report on Patentability—PCT/US06/017120, The International Bureau of WIPO, Geneva, Switzerland—Nov. 6, 2007.

Zhihai He, et al: "A Linear Source Model and a Unified Rate Control Algorithm for DCT Video Coding". IEEE Transactions on Circuits and Systems for Video Technology, IEEE Service Center, Piscataway, NJ, US, vol. 12, No. 11, Nov. 2002, pp. 971-972, 977-978.

Zhihai He, et al: "Optimum Bit Allocation and Accurate Rate Control for Video Coding Via Rho-Domain Source Modeling". IEEE Transactions on Circuits and Systems for Video Technology, IEEE Service Center, Piscataway, NJ, US, vol. 12, No. 10, Oct. 2002, pp. 841-842, 843-844.

* cited by examiner

MACROBLOCK LEVEL BIT ALLOCATION

BACKGROUND

1. Field

The present disclosure relates generally to telecommunications, and more particularly, to video systems.

2. Background

In the world of telecommunications, where bandwidth comes at a premium, video compression plays an important role in multimedia applications. Video compression can be used to dramatically decrease the information required to reconstruct an image by exploiting the fact that there are very few differences between two adjacent frames in a video sequence. This may be achieved by dividing the current frame into macroblocks, and searching the previous frame to determine where each macroblock came from. If the image content of the macroblock in the current frame can be located in the previous frame, then it does not need to be reproduced. The image content can be represented by a "motion vector" indicating its displacement in the current frame from its position in the previous frame. To the extent that there are any changes in image content between the current and previous frame, only the difference, or "residual, information," needs to be transmitted with the motion vector. This technique is often referred to as "temporal compression."

"Spatial compression" is another technique that is often employed in video compression systems. Spatial compression is used to eliminate redundant and non-essential material in each macroblock. Spatial compression is achieved by first transforming the residual information in the macroblock from the space and time domain into the frequency domain using the discrete cosine transform (DCT) method, and then applying quantization and variable length encoding techniques. The quantization process is weighted to assign fewer bits per pixel to the high frequency coefficients, where the eye is less sensitive, and more bits per pixel to the important low frequency coefficients. A quantization parameter (QP) is used to set a number of high frequency coefficients to zero, thereby reducing the number of bits required to represent the frequency coefficients for the macroblock. The QP is used to ensure that the bit budget for the frame is met. In some conventional video compression systems, the same QP is used for each macroblock. This approach is straightforward, but does not necessarily result in the best picture quality. Preferably, the QP should be varied over the frame such that macroblocks with more information are allocated more bits from the bit budget.

SUMMARY

One aspect of a video system is disclosed. The video system includes a video processor configured to generate blocks of information for a frame of video, and a controller configured to allocate bits from a bit budget to each of the blocks, the number of bits being allocated to each of the blocks being a function of the information contained therein. The video processor is further configured to use the bits allocated to each of the blocks to represent the information contained therein.

Another aspect of a video system is disclosed. The video system is configured to generate blocks of information for a frame of video. The video system includes means for allocating bits from a bit budget to each of the blocks, the number of bits being allocated to each of the blocks being a function of the information contained therein, and means for representing the information in each of the blocks using the bits allocated to it.

One aspect of a method to process video is disclosed. The method includes generating blocks of information for a frame of video, allocating bits from a bit budget to each of the blocks, the number of bits being allocated to each of the blocks being a function of the information contained therein, and using the bits allocated to each of the blocks to represent the information contained therein.

Another aspect of a method to process video using a video processor is disclosed. The video processor is configured to generate blocks of information for a frame of video, and includes a texture engine. The method includes passing the blocks of information in the frame through the texture engine a first time to generate statistics relating to the information in each of the blocks, and passing the blocks of information in the frame through the texture engine a second time to allocate bits from a bit budget to each of the blocks based on the statistics, and using the bits allocated to each of the blocks to represent the information contained therein.

Computer readable media embodying a program of instructions executable by a computer to perform a method of video processing is disclosed. The method includes generating blocks of information for a frame of video, allocating bits from a bit budget to each of the blocks, the number of bits being allocated to each of the blocks being a function of the information contained therein, and using the bits allocated to each of the blocks to represent the information contained therein.

BRIEF DESCRIPTION OF THE DRAWINGS

Various aspects of a video processor are illustrated by way of example, and not by way of limitation, in the accompanying drawings, wherein.

DETAILED DESCRIPTION

The detailed description set forth below in connection with the appended drawings is intended as a description of various embodiments of a video processor and is not intended to represent the only embodiments in which the video processor may be practiced. The detailed description includes specific details for the purpose of providing a thorough understanding of the video processor. However, it will be apparent to those skilled in the art that the video processor may be practiced without these specific details. In some instances, well known structures and components are shown in block diagram form in order to avoid obscuring the concepts of the video processor.

Figure 1:
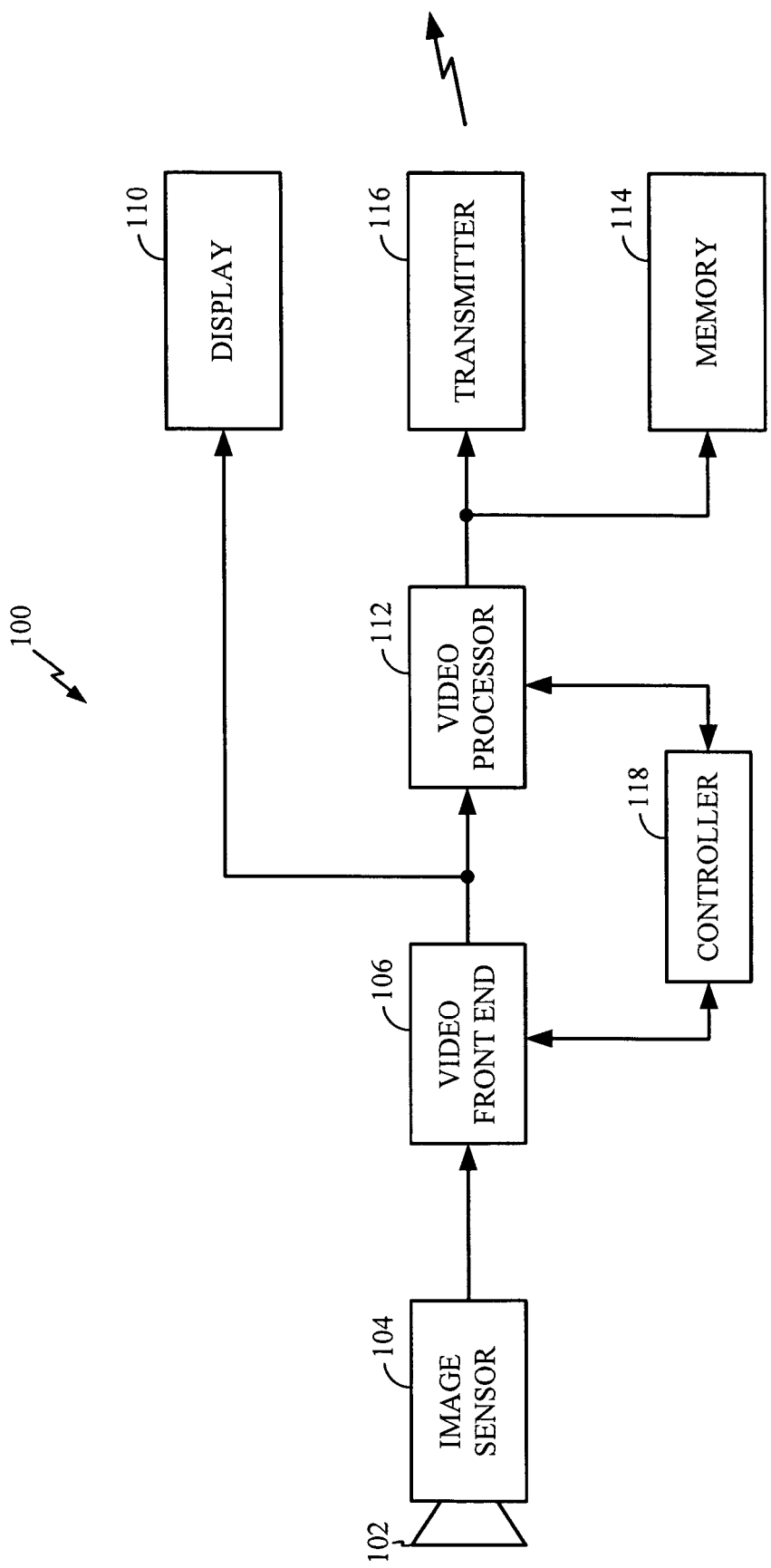
FIG. 1 is a conceptual block diagram illustrating an example of a video system.

FIG. 1 is a conceptual block diagram illustrating an example of a video system suitable for integration into a telecommunications device. The telecommunications device may a wired or wireless phone, a personal digital assistant (PDA), a laptop computer, a desktop computer, a modem, a camera, a game console, video conferencing or broadcast equipment, or any other suitable device capable of supporting video applications.

The video system 100 may include a lens 102 which focuses an image onto a sensor 104. The sensor 104 may be a charge-coupled device (CCD), a complimentary metal oxide semiconductor (CMOS) image sensor, or any other suitable sensor. A video front end (VFE) 106 may be used to process the image captured by the sensor 104. The processing performed by the VFE 106 may include white balance, color correction, gamma adjustment and/or other processing functions. The processed video image may be presented to a display 110 for viewing and/or a video processor 112 for compression. The compressed video image may be archived in memory 114 and/or provided to a transmitter 116 for transmission across a network or telecommunications link.

A controller 118 may be used to control the operation of the video system 100. The controller 118 may be implemented as a stand-alone component, or distributed across one or more components within the video system 100 and/or the telecommunications device. The controller 118 may be implemented as hardware, firmware, software, or any combination thereof. By way of example, the controller 118 may be implemented with a microprocessor, a digital signal processor (DSP), an application specific integrated circuit (ASIC), programmable logic, dedicated hardware, or any other suitable manner. For the purposes of explanation, the controller 118 will be described in terms of its functionality. The manner in which is implemented will depend on the particular application and the design constraints imposed on the overall system. Those skilled in the art will recognize the interchangeability of hardware, firmware, and software configurations under these circumstances, and how best to implement the described functionality for each particular application.

Figure 2:
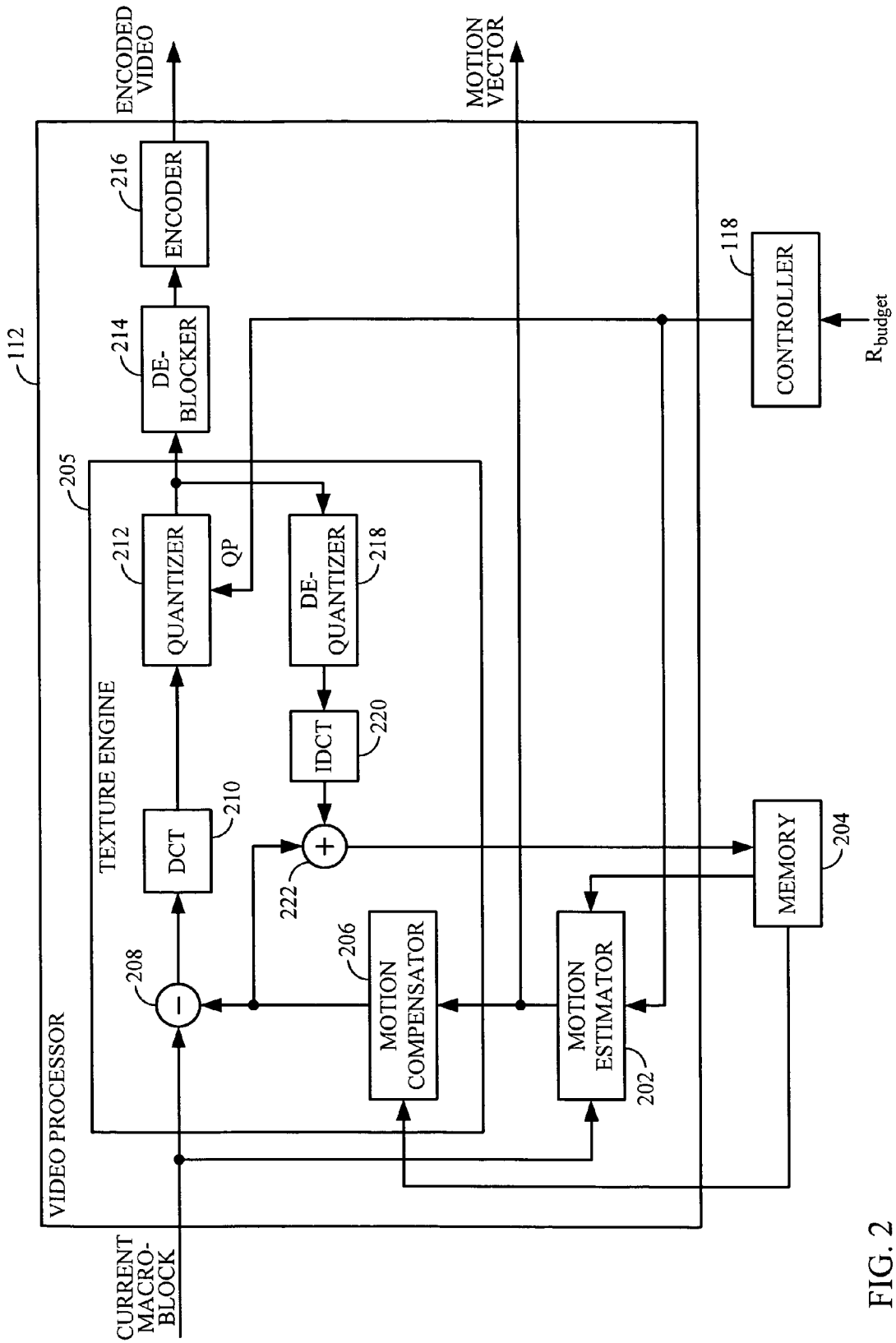
FIG. 2 is a conceptual block diagram illustrating an example of a video processor and controller in a video processor.

FIG. 2 is a conceptual block diagram illustrating an example of a video system in communication with a controller. A motion estimator 202 may be used to determine a motion vector for each macroblock in the current frame to represent the displacement of that macroblock from its position in the previous frame. The motion estimator 202 performs this function by searching the previous frame stored in memory 204 for each macroblock in the current frame, and computing its displacement. The search process utilizes an algorithm that finds the best match between a macroblock in the current frame and a block of pixels from the previous frame within a defined search space. The search algorithm is generally performed using a Sum of Absolute Difference (SAD) computation, which is well known in the art. In particular, the motion estimation 202 compares each macroblock in the current frame with its surrounding area in the previous frame and attempts to find a match indicated by the minimum SAD.

A texture engine 205 may use the motion vectors produced by the motion estimator 202 for temporal and spatial compression of the residual information in the frame. The residual information may be generated by subtracting the pixel information in each macroblock from the pixel information in its corresponding macroblock from the previous frame. A motion compensator 206 may use the motion vectors to locate the corresponding macroblocks from the previous frame stored in memory 204, and provide them to the input of a substrator 208.

A DCT 210 may be used to transform the residual information from the subtractor 208 from the space and time domain into the frequency domain. The transform operation is analogous to transforming a time domain signal into a frequency domain signal using a Fast Fourier Transform (FFT), except that the transform operates on a two-dimensional block rather than a one-dimensional signal. The DCT 210 is generally performed on an 8×8 block of the macroblock producing 64 frequency coefficients. A quantizer 212 may be used to reduce the frequency coefficients produced by the transform 210. This is achieved by reducing the precision of the transform coefficients so that a number of high frequency coefficients near zero are set to zero, leaving only a few low frequency non-zero coefficients. This may be performed by dividing each frequency coefficient by the QP from the controller 118 and truncating the result. The higher the QP, the more high frequency coefficients that are set to zero.

A deblocker 214 may be used to remove edge artifacts on block boundaries in the reconstructed image. This may be achieved by an interpolation process that to creates a more visually pleasing transition between block boundaries. Alternatively, other well known processes may be used to remove edge artifacts.

An encoder 216 may be used to compress the quantized transform coefficients before archiving the information in memory 114 (see FIG. 1) or transmitting it over a network or telecommunications link. There are many well known compression algorithms that may be used. A common method that is often employed involves replacing frequently occurring coefficients with short binary codes and replacing less frequent coefficients with longer binary codes. The result is a sequence of variable-length binary codes. These codes are combined with synchronization and control information to form a coded bit-stream. The control information includes the motion vectors required to reconstruct the image at the receiver.

The current frame should be stored so that it can be used as a reference frame when the next frame is encoded. Instead of simply copying the current frame into memory, the quantized transform coefficients are inversed quantized 218, inverse transformed using an inverse transform 220, and added 222 to the motion compensated frame to create a reconstructed frame that is stored in memory 204. This process ensures that the contents of the frame stored in memory 204 is identical to the frame reconstructed by the receiver. When the next frame is encoded, the motion estimator 202 uses the contents of the frame stored in memory 204 as the previous frame to determine the best matching area for motion compensation.

The controller 118 is responsible for ensuring that the coded bit-stream for the frame does not exceed the bit budget, i.e., the coding bit rate. This is achieved by selecting the appropriate QP at the macroblock level to achieve the target coding bit rate ($R_t$) for the frame. The target coding bit rate $R_t$ may be provided to the controller from a central processing unit (CPU), or other processing entity, within the telecommunications device. There are a number of rate control algorithms that exist today to compute a macroblock-level QP from the target coding rate $R_t$. However, a rate control algorithm the operates in the ρ-domain is believed to be more accurate. "ρ" denotes the percentage of non-zero data among the quantized transform coefficients. In a typical transform coding system, there is a linear relationship between $\rho_{budget}$ and the target coding bit rate $R_t$, where $\rho_{budget}$ is the number of non-zero data among the quantized transform coefficients in the frame needed to meet the bit budget. The linear relationship between the two can be represented by the following equation:

$$R_t = A\rho_{budget} + B \tag{1}$$

where A and B are constants generated by the CPU, or other processing entity, within the telecommunications device. The constants may be adjusted to account for variations in the synchronization and control information resulting from different motion activity levels in the picture.

The controller 118 may include a look-up table (not shown) that maps the ρ to the QP at the frame level. The ρ-QP table may be derived empirically and programmed into the controller 118 prior to operation. Alternatively, the ρ-QP table may be adjusted on the fly during operation. In any event, the ρ-QP table may be used by the controller 118 to derive a QP for each macroblock in a scanline fashion from the $\rho_{budget}$ computed from equation (1). This computation may be accomplished in a number of ways. By way of example, the controller 118 may implement a frame level QP selection algorithm, which assigns the same QP to each macroblock in the frame. The QP may be derived by computing $\rho_{budget}$ from equation (1), and mapping the $\rho_{budget}$ to a QP using the ρ-QP table. This QP may then be provided to the quantizer 212 to generate the quantized transform coefficients for each macroblock. Alternatively, a Greedy algorithm, or any other suitable rate control algorithm, may be used to derive the macroblock-level QP. The Greedy algorithm is well known in the art.

Whether the controller employs a frame level QP selection algorithm, a Greedy algorithm, or any other type of rate control algorithm, improved performance may be achieved with a second pass through the texture engine 205. In this dual-pass configuration, various statistics may be generated from the first pass that can be used by the texture engine 205 on the second pass to improve picture quality. In particular, on the first pass through the texture engine 205, the ρ-QP table may updated to reflect the true image conditions of the frame. The quantized transform coefficient can then be generated on the second pass through the texture engine 205 with better accuracy as described in greater detail below. In addition, the SAD generated by the motion estimator 202 for each macroblock on the first pass through the texture engine 205 can be used on the second pass to derive the QP on a macroblock level so that macroblocks with more residual information are allocated more quantized transform coefficients.

The controller 118 may be configured to derive the QP on a macroblock level using a two step process. First, the controller 118 computes the ρ from the SAD. Second, the updated ρ-QP table is used to map the computed ρ to the QP. The relationship between the ρ and the SAD can be modeled using the following equation:

$$\rho_{slice\,i} \approx \frac{\sum_{j=1}^{M_i} \sqrt{\varphi_{i,j}}}{\sum_{k=1}^{K} \sum_{j=1}^{M_k} \sqrt{\varphi_{k,j}}} \rho_{budget}, \quad (2)$$

where $\rho_{slice\,i}$ is the ρ budget for the $i^{th}$ slice of the frame which includes $M_i$ macroblocks, K is the number of slices in the frame, and φ is the standard deviation, i.e., the squared-root of the sum of the squared error, of the residual information.

Assuming that the macroblock variance φ across the slice is relatively similar, the ρ for each macroblock in the slice can be represented by the following equation:

$$\rho_{i,j} \approx \frac{\rho_{slice\,i}}{M_i} (j = 1, \ldots M_i), \quad (3)$$

The SAD provides a good estimation of the standard deviation φ. The estimation becomes even more accurate as the number of macroblocks M in the slice increases. Thus, with a proper slice partitioning scheme over the frame, the SAD computed by the motion estimator 202 on the first pass through the texture engine 205 can be substituted directly into equation (2) for the variance with negligible error.

The reason the SAD might be used in some embodiments of the video processor is twofold. First, the computation of the SAD is generally less complex than the variance in terms of hardware implementation. Second, the SAD computation is available from the motion estimator, and therefore, does not require any additional processing.

The manner in which the frame is sliced may vary depending on the particular application, the performance requirements, and the overall design constraints. One example will be provided below for the purposes of illustration only. It will be appreciated by those skilled in the art that other partitioning schemes may be used to implement the various concepts described throughout this disclosure.

In this example of a slice partitioning scheme, the mid-range SAD values from the first pass through the texture engine 205 are identified. The mid-range will be defined here as being between 20-80% of the full SAD range, but may be any range in actual implementation. In addition to identifying the mid-range SAD values, the average SAD for the frame may also be computed. The mid-range SAD values and the average SAD for the frame may be used to divide the total number of N macroblocks into M slices with variable slice length ($L_i$) based on the following procedure:

(1) The $i^{th}$ slice starting from the $j^{th}$ macroblock in the frame is identified. At the start of the frame, both i=0 and j=0. The algorithm proceeds to step (2).

(2) If the $j^{th}$ macroblock is greater than a threshold, then the algorithm branches to step (6). Otherwise, the algorithm proceeds to step (3). The threshold in this example is (N-8), but may be any value in actual implementation.

(3) Assuming the $j^{th}$ macroblock in the frame is less than or equal to the threshold, the algorithm marks each macroblock indexed from j+2 to j+5 which has a mid-range SAD value. If one or more of these macroblocks are marked, then the algorithm proceeds to step (4). Otherwise, the algorithm branches to step (5).

(4) The algorithm identifies the marked macroblock whose average SAD is closest to the average SAD for the frame. The average SAD for each macroblock may be a computed average with its left and right neighboring macroblocks. The identified macroblock is used to start a new slice, i.e., the identified macroblock becomes the $j^{th}$ macroblock in step (1).

(5) The algorithm determines the first macroblock indexed after j having a mid-range SAD value. This macroblock will be designated the $k^{th}$ macroblock. If (k−j)>10, then the algorithm loops back to step (1) to start a new slice with the starting macroblock indexed at j+5. Otherwise, the algorithm loops back to step (1) to start a new slice with the starting macroblock indexed at (j+k)/2.

(6) If the number of remaining macroblocks ≧6, the algorithm divides them into two slices at the macroblock with the average SAD closest to the frame average SAD. Otherwise, all the remaining macroblocks are included in the last slice.

Once the frame is sliced appropriately, the $\rho_i'$ for each slice is determined using the following equation:

$$\rho_i' = \frac{\rho_{slice\,i}}{\sum_{j=i}^{M} \rho_{slice\,i}} (\rho_{budget} - \rho_{used}), \quad (4)$$

where $\rho_{used}$ is the ρ actually used so far, and $\rho_{slice\ i}$ is the ρ budget for slice i computed by equation (2).

Within the $i^{th}$ slice, the macroblocks are processed in the scanline order. The ρ for the $m^{th}$ macroblock (m=1, ..., $L_i$) may be obtained from the following equation:

$$\rho_{i,m} = \frac{\rho'_i - \sum_{k=1}^{m-1} \rho_{i,k}}{L_i - m + 1}, \quad (5)$$

The corresponding QP ($q_{i,m}$) for each macroblock can be found from the ρ-QP table.

The QP ($q_{i,m}$) for each macroblock may be adjusted to ensure a smooth transition between slice boundaries in the frame. An example of how QP ($q_{i,m}$) may be adjusted is given below with the understanding the other methods may be used in actual implementation.

The algorithm processes the first macroblock in the slice (m=1) as follows: if $q_{i,m} > q_{frame}$, then $q_{i,m} = q_{frame} + 1$, otherwise $q_{i,m} = \max(q_{frame}-1, q_{i,m})$, where $q_{frame}$ is the average QP of the frame.

The algorithm processes the remaining macroblocks in the slice to satisfy the following three conditions:

(1) The $q_{i,m}$ should be within the range of [$q_{frame}-1-2(L_i-m+1)$, $q_{frame}+1+2(L_i-m+1)$];

(2) The difference between $q_{i,m}$ and the QP of its previous macroblock should be within the range of [−2, 2]; and (3) The value of $q_{i,m}$ should be within the range of [1, 31].

In at least one embodiment of the video system, the controller 118 may be configured to operate the texture engine 205 a single-pass or a dual-pass mode depending on the available processing resources and the expected improvement in picture quality by operating in the dual-pass mode. The criteria used by the controller 118 to dynamically switch between modes may vary depending on the specific application, the preferences of the designer, and the overall design constraints. As an example, the controller 118 may be configured to monitor the variation in the SAD across the frame. If the controller 118 determines that there is very little variation, then a single pass through the texture engine 205 using the same QP throughout the frame may be sufficient. If the controller 118, on the other hand, determines that there is a large variation in the SAD across the frame, then a second pass through the texture engine 205 may be warranted to give macroblocks with more information more bits from the bit budget.

Figure 3:
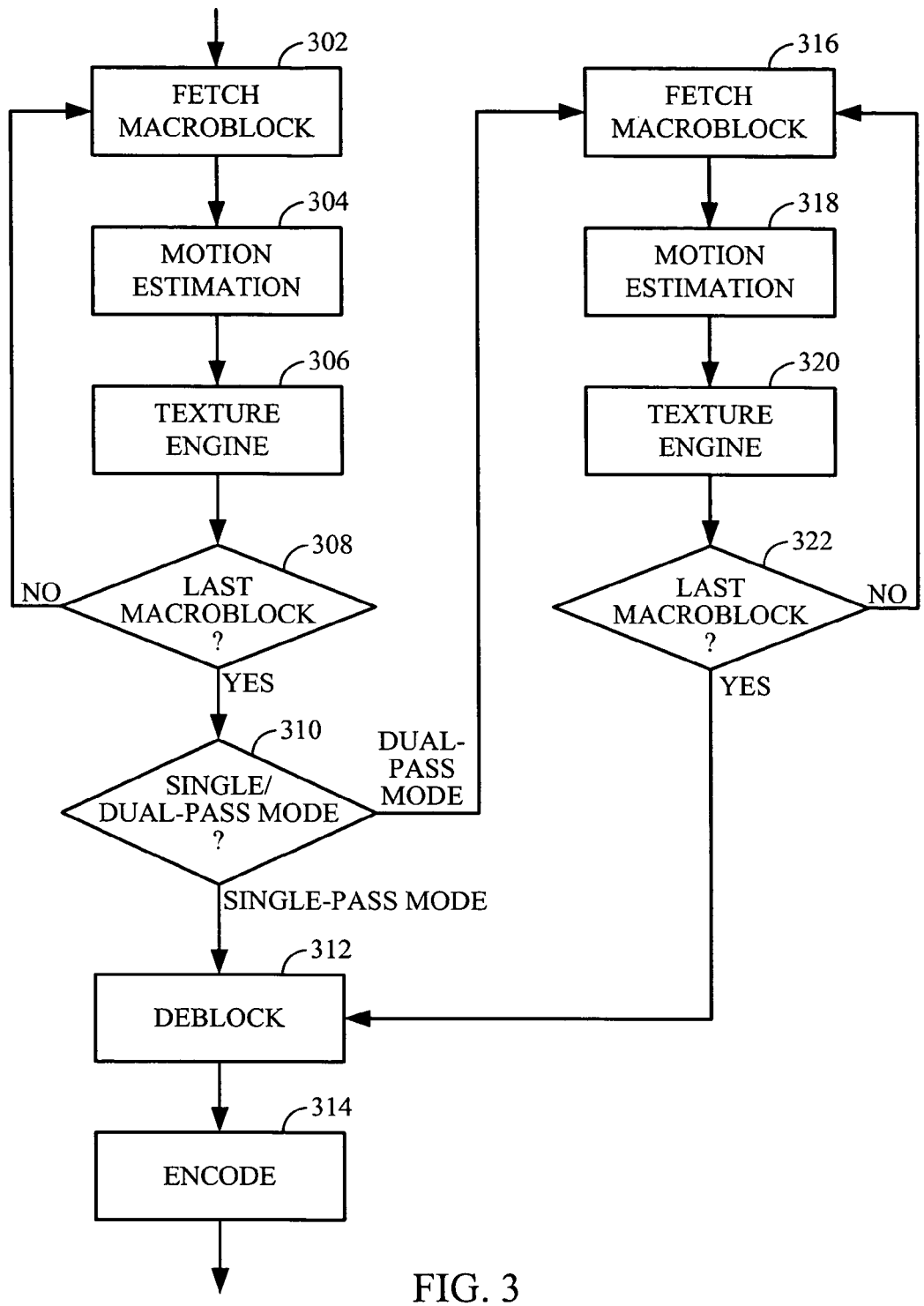
FIG. 3 is a flow diagram illustrating the operation of a video processor cable of operating in single-pass and dual-pass modes.

FIG. 3 is a flow chart illustrating the operation of a video system capable of operating in single-pass and dual-pass modes. In step 302, a macroblock is fetched from memory. The macroblock is provided to the motion estimator in step 304. The motion estimator computes a motion vector representative of the macroblock's displacement in the current frame from its position in the previous frame. In addition, the SAD used to compute the motion vector may be stored for later use on the second pass through the texture engine.

The motion vector for the macroblock is provided to the texture engine in step 306. As described in greater detail above, the texture engine may use the motion vector to locate in memory the corresponding macroblock in the previous frame and compute the difference between the two. The difference, or residual information, is then converted by the texture engine to quantized transform coefficients based on the QP provided to the texture engine by the controller. Information required to construct a ρ-QP table at the frame level is also stored in memory.

In step 308, the controller determines whether the quantized transform coefficients output from the texture engine belong to the last macroblock in the current frame. If they do not, then the controller loops back to step 302, where the next macroblock in the frame is fetched from memory. If, on the other hand, the quantized transform coefficients output from the texture engine belong to the last macroblock in the frame, then the first pass through the texture engine is complete. The controller then determines, in step 310, whether a second pass through the is needed. Assuming that the controller determines that a second pass is not required, the frame is deblocked in step 312 and encoded in step 314. Otherwise, the controller configures the video processor for another pass through the texture engine. This includes constructing the ρ-QP table for the frame from the information stored during the first pass through the texture engine.

On the second pass, a macroblock in the current frame is fetched from memory for the second time, in step 316, and provided to the motion estimator. The motion estimator computes a motion vector for the macroblock, in step 318, and provides the motion vector to the texture engine.

The texture engine computes, in step 320, the quantized transform coefficients using a QP that better represents the content of the macroblock. The QP is derived by the controller by first computing ρ using equation (5), then mapping the computed ρ to a QP value using the frame level ρ-QP table developed during the first pass through the texture engine, and finally adjusting the QP to ensure a smooth transition between slice boundaries in the frame. This process continues until all the macroblocks in the frame have been passed through the texture engine a second time. In step 322, the controller determines whether the quantized transform coefficients outputted from the texture engine are for the last macroblock in the frame. If not, the controller loops back to step 316 to fetch the next macroblock in the frame. Otherwise, the frame is deblocked in step 312 and encoded in step 314.

Figure 4:
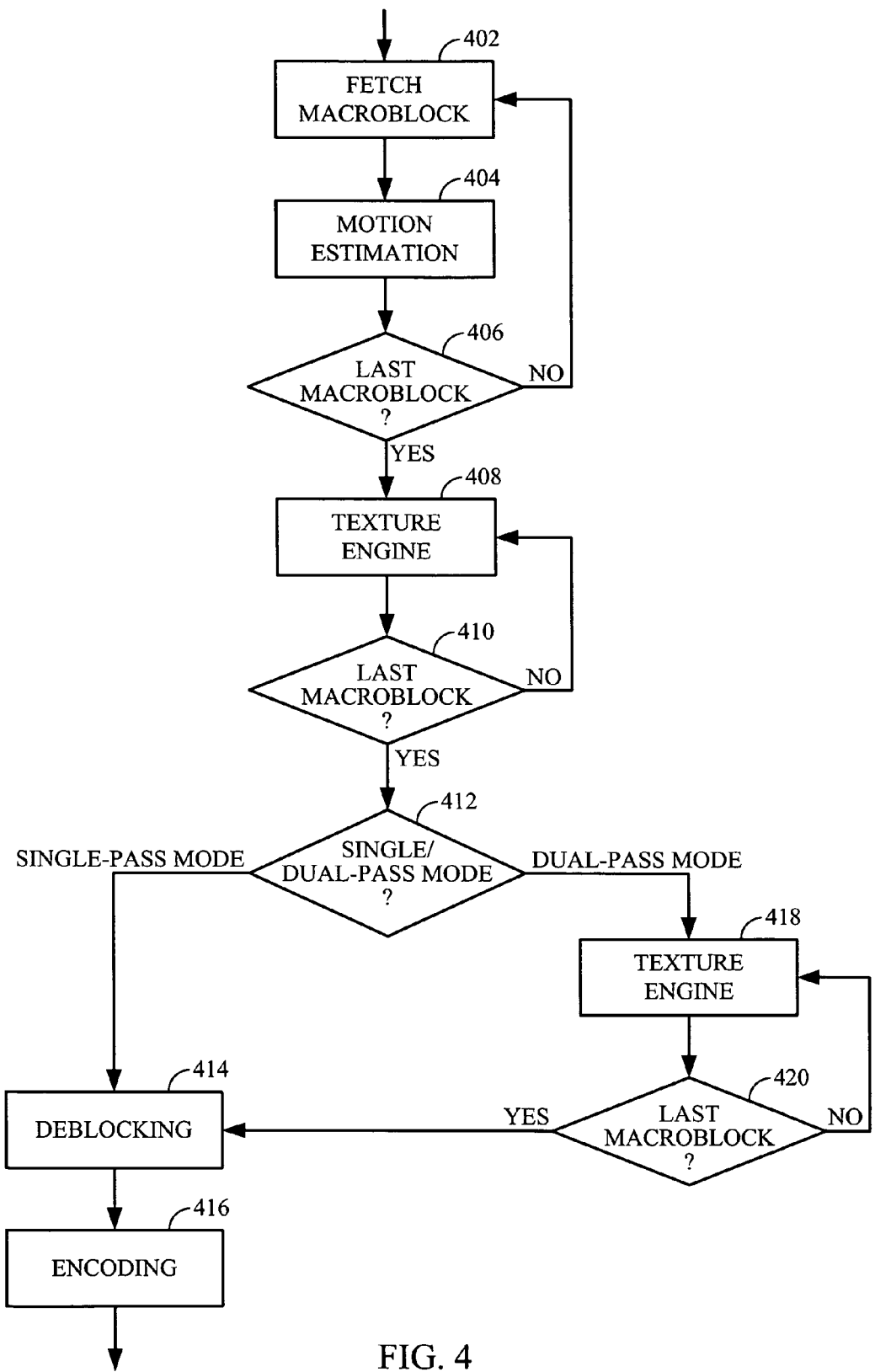
FIG. 4 is a flow diagram illustrating an alternative way to operate a video processor cable of operating in single-pass and dual-pass modes.

FIG. 4 is a flow chart illustrating an alternative way in which the video processor may be operated to support both single-pass and dual-pass operation. In this configuration, the motion estimation process is performed only once. The motion vector and SAD computed for each macroblock are used during both passes through the texture engine in the dual-pass mode.

Referring to FIG. 4, a macroblock is fetched from memory in step 402. The macroblock is provided to the motion estimator in step 404. The motion estimator computes determines the SAD of the macroblock, and computes a motion vector from the SAD. Both the motion vector and the SAD are stored for later use by the texture engine. This process is repeated for each macroblock in the frame. In step 406, the controller determines for each macroblock whether it is the last macroblock in the frame. If not, the controller loops back to step 402 to fetch the next macroblock in the frame. Otherwise, the motion vectors for each macroblock are provided to the texture engine.

The texture engine computes, in step 408, the quantized transform coefficient for the residual information in a macroblock based on the QP provided to the texture engine by the controller. Information required to construct a ρ-QP table at the frame level is also stored in memory.

The controller determines, in step 410, whether the quantized transform coefficients output from the texture engine belong to the last macroblock in the current frame. If they do not, then the controller loops back to step 408, where the next motion vector for the next macroblock in the frame is provided to the texture engine. If, on the other hand, the quantized transform coefficients output from the texture engine belong to the last macroblock in the frame, then the first pass through the texture engine is complete. The controller then determines, in step 412, whether a second pass through the texture engine is needed. Assuming that the controller determines that a second pass is not required, the frame is deblocked in step 414 and encoded in step 416. Otherwise, the controller constructs the ρ-QP table for the frame from the information stored in memory during the first pass through the texture engine, and proceeds to step 418 for another pass through the texture engine.

On the second pass, the texture engine computes the quantized transform coefficients using the motion vector computed in step 404 and a more accurate QP. The QP is derived by the controller by first computing ρ using equation (5), then mapping the computed ρ to a QP value using the frame level ρ-QP table developed during the first pass through the texture engine, and finally adjusting the QP to ensure a smooth transition between slice boundaries in the frame. This process continues until all the macroblocks in the frame have been passed through the texture engine a second time. In step 420, the controller determines whether the quantized transform coefficients output from the texture engine belongs to the last macroblock in the frame. If not, the controller loops back to step 418 to process the next macroblock in the frame. Otherwise, the frame is deblocked in step 414 and encoded in step 416.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A video system, comprising:
   a video processor configured to generate blocks of information for a first frame of video and to partition blocks of the first frame into a slice, wherein the blocks are partitioned based on a function of the residual information contained therein; and
   a controller configured to compute a budget for the percentage of non-zero data (ρ) in the slice from the residual information of the blocks in the first frame and to allocate bits from a bit budget to each of the blocks of the slice, the number of bits being allocated to each of the blocks of the slice being a function of the budget for the percentage of non-zero data in the slice;
   wherein the video processor is further configured to use the bits allocated to each of the blocks to represent the information contained therein.

2. The video system of claim 1 wherein the video processor further comprises a motion estimator configured to convert the information in each of the blocks to motion information, the number of bits allocated by the controller to each of the blocks being a function of the motion information contained therein.

3. The video system of claim 2 wherein the motion information in each of the blocks comprises a Sum of Absolute Difference (SAD) value.

4. The video system of claim 1 wherein the controller is further configured to derive a parameter for each of the blocks relating to the bits allocated to the controller, and wherein the video processor is further configured to use the parameters to represent the information in each of the blocks with the allocated number of bits.

5. The video system of claim 4 wherein the video processor comprises a texture engine configured to convert the information in each of the blocks to residual information, and wherein the video processor is further configured to use the bits allocated to each of the blocks to represent the residual information contained therein.

6. The video system of claim 5 wherein the texture engine comprises a quantizer configured to quantize the residual information in the blocks based on the parameters.

7. The video system of claim 6 wherein the controller is further configured to derive the parameters based on the percentage of non-zero data (ρ) among quantized transform coefficients in the first frame.

8. The video system of claim 7 wherein the controller is further configured to derive the parameters by generating a ρ-QP table from the information in the blocks, and using the ρ-QP table to derive the parameters.

9. The video system of claim 8 wherein the controller is further configured to pass the blocks of information through the texture engine to generate the ρ-QP table, and pass the blocks of information through the texture engine a second time to allocate the bits to the individual blocks using the ρ-QP table.

10. The video system of claim 9 wherein the controller is further configured to enable and disable the second pass of the blocks of information through the texture engine.

11. The video system of claim 7 wherein the video processor further comprises a motion estimator configured to convert the information in each of the blocks to motion information, each of the parameters derived by the controller being based on the motion information contained in each respective block.

12. The video system of claim 11 wherein the motion information for each of the blocks comprises a Sum of Absolute Difference (SAD) value.

13. The video system of claim 12 wherein the controller is further configured to derive the parameters by computing ρ for each of the blocks, each of the ρ computations using the SAD for each respective block.

14. A video system configured to generate blocks of information for a frame of video, comprising:
    means for partitioning blocks of a first frame into a slice from the first frame, wherein the blocks are partitioned based on a function of the residual information contained therein;
    means for computing a budget for the percentage of non-zero data (ρ) in the slice from the residual information of the blocks in the first frame;
    means for allocating bits from a bit budget to the blocks of the slice, the number of bits being allocated to each of the blocks of the slice being a function of the budget for the percentage of non-zero data in the slice; and
    means for representing the information in each of the blocks using the bits allocated to each block.

15. The video system of claim 14 further comprising means for converting the information in each of the blocks to motion information, the number of bits allocated to each of the blocks being a function of the motion information contained therein.

16. The video system of claim 15 wherein the motion information in each of the blocks comprises a Sum of Absolute Difference (SAD) value.

17. The video system of claim 14 wherein the means for allocating bits from a bit budget is configured to derive a parameter for each of the blocks relating to the bits allocated to the blocks, and wherein the means for representing the information comprises a quantizer responsive to the parameters.

18. The video system of claim 17 further comprising means for converting the information in each of the blocks to residual information, and wherein the quantizer is further configured to use the bits allocated to each of the blocks to represent the residual information contained therein.

19. The video system of claim 17, wherein the controller is further configured to derive the parameters based on the percentage of non-zero data among quantized transform coefficients in the first frame.

20. A method of processing video, comprising:
    generating blocks of information for a frame of video;
    partitioning the blocks of the first frame into a slice, wherein the blocks are partitioned based on a function of the residual information contained therein;
    computing a budget for the percentage of non-zero data (ρ) in the slice from the residual information of the blocks in the first frame;
    allocating bits from a bit budget to the blocks of the slice, the number of bits being allocated to each of the blocks of the slice being a function of the budget for the percentage of non-zero data in the slice; and
    using the bits allocated to each of the blocks to represent the information contained therein, wherein the method of processing video is performed by a microprocessor.

21. The method of claim 20 further comprising converting the information in each of the blocks to motion information, the number of bits allocated by the controller to each of the blocks being a function of the motion information contained therein.

22. The method of claim 21 wherein the motion information in each of the blocks comprises a Sum of Absolute Difference (SAD) value.

23. The method of claim 20 wherein the allocation of bits from the bit budget comprises deriving a parameter for each of the blocks relating to the bits allocated to the blocks, the parameters being used to represent the information in each of the blocks with the allocated number of bits.

24. The method of claim 23 further comprising converting the information in each of the blocks to residual information, the bits allocated to each of the blocks being used to represent the residual information contained therein.

25. The method of claim 24 wherein the residual information in each of the blocks is represented with the allocated number of bits by quantizing the residual information using the parameters.

26. The method of claim 25, wherein the parameters are derived based on the percentage of non-zero data among quantized transform coefficients in the first frame.

27. The method of claim 26 wherein the parameters are derived by generating a ρ-QP table from the information in the blocks, and using the ρ-QP table to derive the parameters.

28. The method of claim 26 further comprising converting the information in each of the blocks to motion information, the derivation of each of the parameters being based on the motion information contained in its respective block.

29. The method of claim 28 wherein the motion information for each of the blocks comprises a Sum of Absolute Difference (SAD) value.

30. The method of claim 29 wherein the parameters are derived by computing ρ for each of the blocks, each of the ρ computations using the SAD for its respective block.

31. The method of processing video of claim 20, the method being performed by a video processor configured to generate blocks of information for a frame of video, wherein the video processor includes a texture engine, the method comprising:
    passing the blocks of information in the first frame through the texture engine a first time to generate statistics for the first frame; and
    passing the blocks of information in the first frame through the texture engine a second time to allocate bits from the bit budget to each of the blocks based on the statistics, and using the bits allocated to each of the blocks to represent the information contained therein.

32. The method of claim 31, wherein the statistics generated on the first pass through the texture engine comprises a ρ-QP table.

33. The method of claim 32 wherein the first pass through the texture engine further comprises generating a Sum of Absolute Difference (SAD) value for each of the blocks, and wherein the second pass through the texture engine comprises computing ρ for each of the blocks using each respective SAD, mapping the ρ for each of the blocks to a QP, and for each of the blocks, using the QP for the block to quantize the information contained therein.

34. A non-transitory computer readable medium comprising instructions that when executed by a processor perform a method comprising:
    generating blocks of information for a frame of video;
    partitioning the blocks of the first frame into a slice, wherein the blocks are partitioned based on a function of the residual information contained therein;

computing a budget for the percentage of non-zero data (ρ) in the slice from the residual information of the blocks in the first frame;

allocating bits from a bit budget to the blocks of the slice, the number of bits being allocated to each of the blocks of the slice being a function of the budget for the percentage of non-zero data in the slice; and using the bits allocated to each of the blocks to represent the information contained therein.

35. The computer readable medium of claim 34 wherein the method further comprises converting the information in each of the blocks to motion information, the number of bits allocated by the controller to each of the blocks being a function of the motion information contained therein.

36. The computer readable medium of claim 35 wherein the motion information in each of the blocks comprises a Sum of Absolute Difference (SAD) value.

37. The computer readable medium of claim 34 wherein the allocation of bits from the bit budget comprises deriving a parameter for each of the blocks relating to the bits allocated to the blocks, the parameters being used to represent the information in each of the blocks with the allocated number of bits.

38. The computer readable medium of claim 37 wherein the method further comprises converting the information in each of the blocks to residual information, the bits allocated to each of the blocks being used to represent the residual information contained therein.

39. The computer readable medium of claim 38 wherein the residual information in each of the blocks is represented with the allocated number of bits by quantizing the residual information using the parameters.

40. The computer readable medium of claim 39, wherein the parameters are derived based on the percentage of non-zero data (ρ) among quantized transform coefficients in the first frame.

41. The computer readable medium of claim 40 wherein the parameters are derived by generating a ρ-QP table from the information in the blocks, and using the ρ-QP table to derive the parameters.

42. The computer readable medium of claim 40 wherein the method further comprises converting the information in each of the blocks to motion information, the derivation of each of the parameters being based on the motion information contained in each respective block.

43. The computer readable medium of claim 42 wherein the motion information for each of the blocks comprises a Sum of Absolute Difference (SAD) value.

44. The computer readable medium of claim 43 wherein the parameters are derived by computing ρ for each of the blocks, each of the ρ computations using the SAD for each respective block.

* * * * *